(12) United States Patent
Fournand et al.

(10) Patent No.: US 6,972,914 B2
(45) Date of Patent: Dec. 6, 2005

(54) OPTICAL LENS HOLDER

(75) Inventors: Gerald Fournand, Tampa, FL (US); James A. Reed, Clearwater, FL (US); Danne Wright, St. Petersburg, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 22 days.

(21) Appl. No.: 10/802,173

(22) Filed: Mar. 17, 2004

(65) Prior Publication Data

US 2005/0207033 A1 Sep. 22, 2005

(51) Int. Cl.[7] .................................. G02B 7/02
(52) U.S. Cl. .................. 359/819; 359/820; 359/822; 359/823
(58) Field of Search ................ 359/819, 820, 359/821, 822, 823, 824, 811, 813; 351/159, 351/172, 178, 225

(56) References Cited

U.S. PATENT DOCUMENTS 5,446,596 A * 8/1995 Mostrorocco ............... 359/827

OTHER PUBLICATIONS

Portions of BPI Online Catalog, http://www.callbpi.com/.

* cited by examiner

Primary Examiner—Ricky L. Mack
Assistant Examiner—Brandi Thomas
(74) Attorney, Agent, or Firm—Fulbright & Jaworski LLP

(57) ABSTRACT

The invention relates to an optical lens holder comprising a supporting means and a first and a second arm defining a lens holder general plane, first and second arms being relatively movable with regards to each other and each arm having spaced apart first and second end portions and an intermediate portion, the arms being mounted on the supporting means through their first end portions and the second end portions of each arm comprising an optical lens accommodating means facing each other, whereby an optical lens can be maintained within the accommodating means of the first and second arms with its optical axis orthogonal to the general plane of the lens holder through at least one, preferably one or two contact points between the lens periphery and each of the first and second lens accommodating means, wherein at least the second end portion of each arm comprises a material having a dielectric constant at 1 MHz equal to or higher than the dielectric constant of the optical lens material.

51 Claims, 3 Drawing Sheets

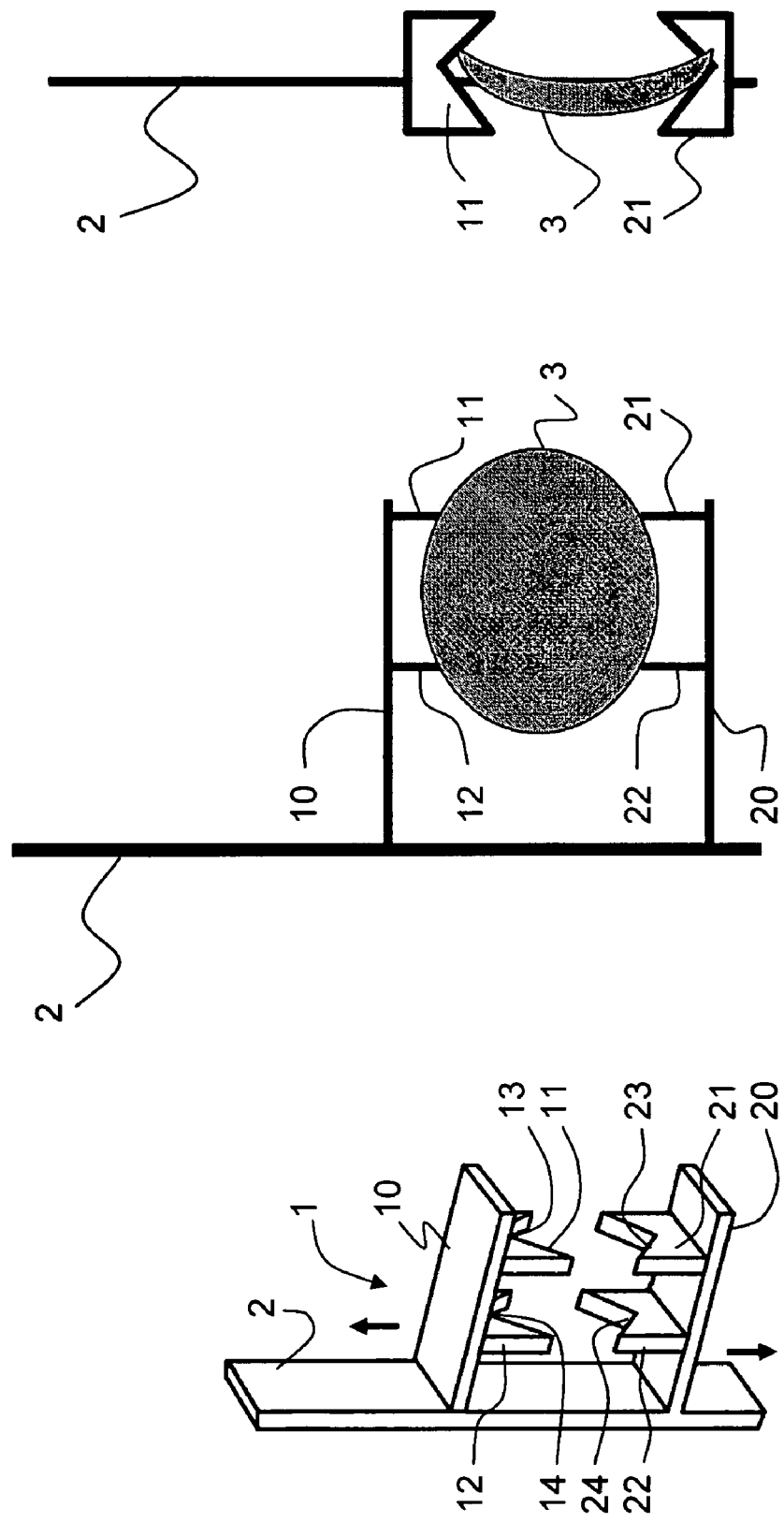

OPTICAL LENS HOLDER

FIELD OF THE INVENTION

The present invention relates to an optical lens holder, for holding one or more optical lenses, made of organic glass, in particular ophthalmic lenses, during treatments of the optical lenses, and in particular during a corona discharge treatment, which prevents damage to the optical lens such as burning or heat defects during a corona discharge treatment.

BACKGROUND OF THE INVENTION

Corona discharge is widely used to treat the surfaces of plastic parts such as organic glass optical lenses in order to improve the adhesion properties of the surfaces. In most cases, such parts are just placed on a belt or a similar device and the surface to be treated does not touch any other material. If the lens is submitted to several treatment steps then manual handling is generally required to put on and to take the lens off the belt.

However, manual handling is troublesome.

The object of the invention is to provide a new means for handling the lens during a corona treatment without inducing any damage to the lens during the corona treatment and during the handling.

According to the invention, one uses a means holding the part by its periphery so that the treated surface of the part be held in front of the active area of the treating device, for example the electric arc in a corona discharge treatment. In such circumstances, an area of overheating might occur at the contact points between the part and the holder and burns or defects due to heat might be observed.

An object of the invention is to provide an optical lens holder which reduces, preferably avoids, the apparition of burned or overheated areas around the contact points of the optical lens with the holder. Thus, to reduce or avoid the appearance of such defects, in particular during a corona discharge treatment of the optical lens, it has been determined according to the invention that accumulation of electric charges on the treated lens shall be avoided as such an accumulation can create an area of overheating especially at the contact points between the optical lens and the holder. Also, it is important that heat created in the lens during the treatment, in particular at the contact points, be dissipated as fast as possible. Of course, the means used to obtain the diminution or disappearance of the defects shall not detrimentally interfere with the treating process and in particular with a corona discharge treatment.

SUMMARY OF THE INVENTION

According to the invention, the above mentioned problems are solved by providing an optical lens holder for holding at least one optical lens during lens treatments and in particular a corona discharge treatment which comprises a supporting means and a first and a second arm defining a lens holder general plane, first and second arms being relatively movable with regards to each other and each arm having spaced apart first and second end portions, and an intermediate portion, the arms being mounted on the supporting means through their first end portions and the second end portions of said arms comprising optical lens accommodating means facing each other, whereby an optical lens can be maintained within the accommodating means of the first and second arms with its optical axis orthogonal or nearly orthogonal to the general plane of the lens holder through at least one, preferably one or two contact points between the lens periphery and each of the first and second lens accommodating means, wherein at least the second end portion of each arm comprises a material having a dielectric constant at 1 MHz equal to or higher than the dielectric constant of the optical lens material.

Preferably, the material of the second end portions of the arms have a dielectric constant at 1 MHz of 3.0 or more.

Furthermore, the material of the second end portions of the arms preferably also have a specific heat (kJ kg$^{-1}$ K$^{-1}$) higher than the specific heat of the optical lens material to be held in the holder and more preferably have a specific heat higher than 1.2. kJ kg$^{-1}$ K$^{-1}$.

In one embodiment, the material of the second end portions of the arms is selected from plastic materials and in particular plastic materials selected from the group consisting of polyacrylonitrile-butadiene-styrene (ABS), polyoxymethylene homo and copolymers (POMH and POMC), cellulose acetate (CA), cellulose acetate butyrate (CAB), polyamides, polyetherimides (PEI), polyalkylmethacrylates such as polymethylmethacrylates (PMMA) and polyaramides.

Although only the second end portions of the arms may be made of the material having the required dielectric constant value, the entire arm can be made of this material.

In an other embodiment of the invention, the second end portions of the arms is made of an electrically conductive material or is covered with an electrically conductive material such as a metal.

Suitable metals are aluminum, stainless steel, brass, copper, gold.

Preferred metals are stainless steel, aluminum.

When the second end portion is made of a metal such as aluminum, the remaining portion of the arm is preferably made of an electrically insulating material. Appropriate electrically insulating material can be any classical electrically insulating material including the plastic materials recited above.

Among the preferred electrically insulating plastic material, there may be cited polyoxymethylene homo and copolymers, polyacrylonitrile butadiene styrene.

Applicant has established that the use of a metal or a metallic coating for the second end portions of the arms of the lens holder of the invention avoids any localized overheating, in particular when using low speed of passage in a corona discharge device such as 3.6 mm/s or less.

If one covers the second end portions of the arms with an aluminum foil, the thickness of the aluminum foil is ranging from 0.00017 inches to 0.0059 inches (i.e. 0.0043 mm to 0.15 mm).

Another kind of coatings are those comprising electro-conductive polymers, preferably having a conductivity better than polycarbonate.

The supporting means is not electrically conductive.

When a lens is placed in the lens holder, at least one of the faces of the lens is freely accessible for a corona treatment, preferably both faces of the lens are freely accessible for a simultaneous corona treatment.

In order to further improve heat evacuation, specific designs of the lens accommodating means have been established.

In one embodiment, the lens accommodating means are in the form of recesses managed in the second end portions of the arms. Preferably, the recesses have a flat bottom wall and two inclined sidewalls, the angle of the sidewalls with the bottom wall being such that a lens placed in the holder will be maintained either through only two contact points with the bottom wall or four contact points with the sidewalls and that there is no areas created between the lens periphery and the holder in which for example the electrical arc carried by an air flow coming out from corona heads will get trapped, creating areas of overheating. Preferably, the angle between the lateral sides and the bottom of the recesses is 120° or more.

Preferably also, the thickness of the arms and in particular of the second end portions shall be as low as possible.

Typically, the second end portions of the arms are thinner than the remaining portions of the arms and have a thickness, generally ranging from 2 to less than 13 mm, preferably ranging from 2 to 10 mm. Thus, the arms can absorb the heat of the lens faster and also dissipate faster the heat through air exchange.

In another embodiment, the lens accommodating means of each arm are in the form of two identical spaced apart tabs projecting perpendicularly from facing surfaces of the first and second arms and having a lens receiving notch at their free ends. Preferably, the notches have a V shape with an angle of 90° C. or more. In this embodiment, the lens is maintained in the lens holder through four contact points between its periphery and the surfaces of the notches of the tabs. In this latter embodiment, the arms or only the tabs may be elastically deformable to allow accomodation of the lens.

BRIEF DESCRIPTION OF THE DRAWINGS

FIG. 3 is a schematic perspective view of a second embodiment of an optical lens holder according to the invention;

FIG. 4 is a schematic front view of the optical lens holder of FIG. 3;

FIG. 5 is a schematic side view of the optical lens holder of FIG. 3; and

DETAILED DESCRIPTION OF THE INVENTION AND PREFERRED EMBODIMENTS

Figure 1:
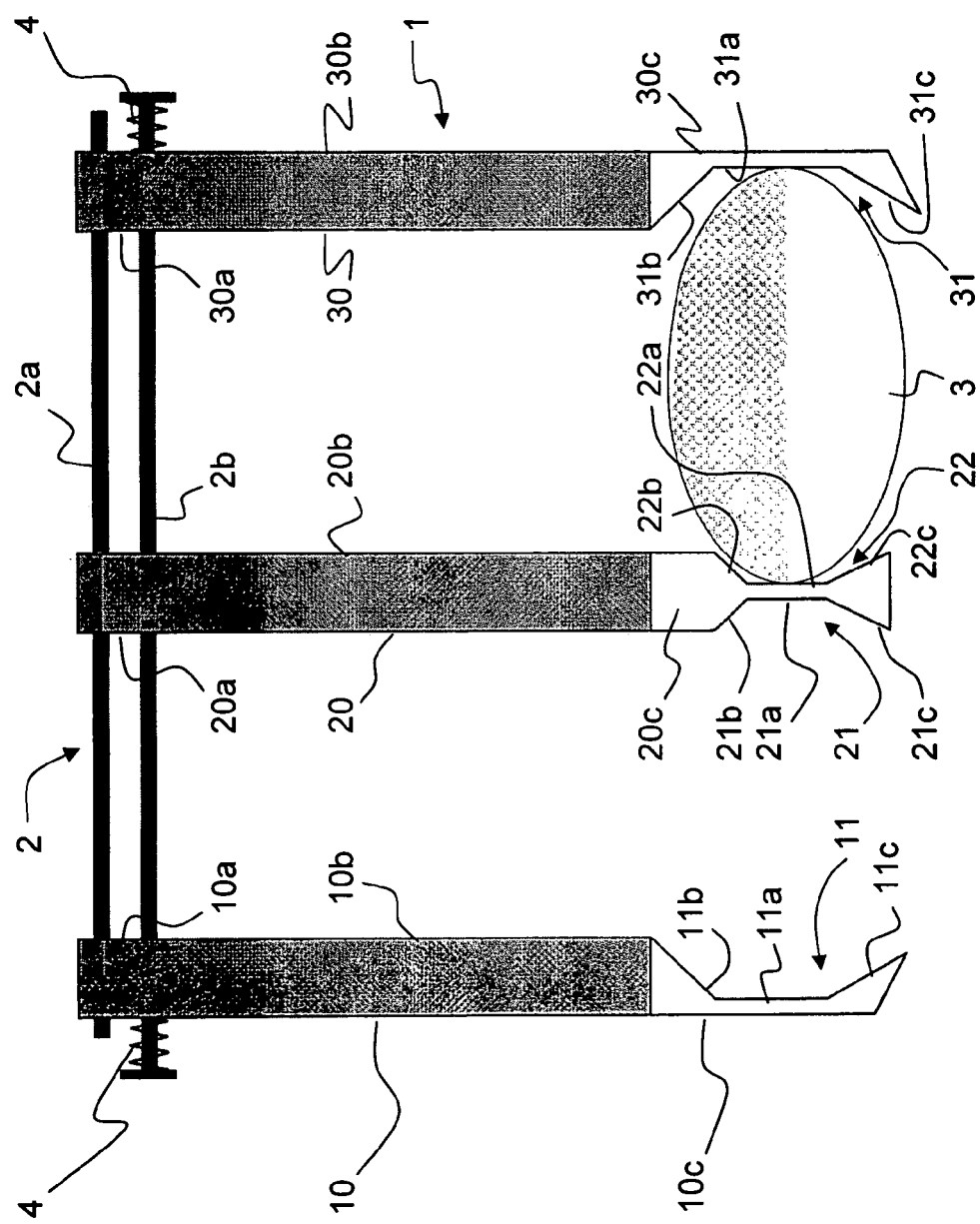
FIG. 1 is a schematic front view of a first embodiment of an optical lens holder according to the invention.

Referring to FIG. 1, there is shown a first embodiment of an optical lens holder 1 according to the invention. The holder 1 comprises a supporting means 2 in the form of a pair of parallel rails 2a, 2b and three arms 10, 20, 30, namely a central arm 20 and two lateral arms 10, 30 on both sides of the central arm 20.

Each arm 10, 20, 30 comprises a first end portion 10a, 20a, 30a and a second end portion 10c, 20c, 30c and an intermediate portion 10b, 20b, 30b.

The arms 10, 20, 30 are mounted through their first ends 10a, 20a, 30a to the supporting rails 2a, 2b in a spaced a part relationship, thus defining a general plane of the holder, i.e. the plane of the drawing sheet.

In the embodiment of FIG. 1, central arm 20 is fixedly mounted on the rails 2a, 2b whereas both lateral arms 10, 30 are slidably mounted on rails 2a, 2b.

For example, as shown on FIG. 1, each of the lateral arms 10, 30 can be biased by a compression spring 4 mounted on rail 2b.

Thus, springs 4 urge lateral arms 10, 30 towards central arm 20 to a final position for firmly maintaining an inserted lens 3.

Of course, lateral arms 10, 30 may simply be sliding on rails 2a, 2b and blocking means such as blocking screws may be provided to maintain the lateral arms at the desired position.

Second end portions 20c of central arm 20 comprises two opposite lens accommodating recesses 21, 22 and each lateral arm second end portion 10c, 30c comprises one lens accommodating recess 11, 31, each of the recesses 11, 31 of the second end portions 10c, 30c of lateral arms 10, 30 facing one corresponding recess 21, 22 of the central arm 20.

As seen on FIG. 1, each of the lens accommodating recesses comprises a flat bottom wall 11a, 21a, 22a, 31a and two inclined flat sidewalls 11b, 11c, 21b, 21c, 22b, 22c, 31b, 31c, respectively.

Preferably, the inclined flat sidewalls form with the flat bottom wall an angle of 1200 or more, preferably 1250.

Figure 2:
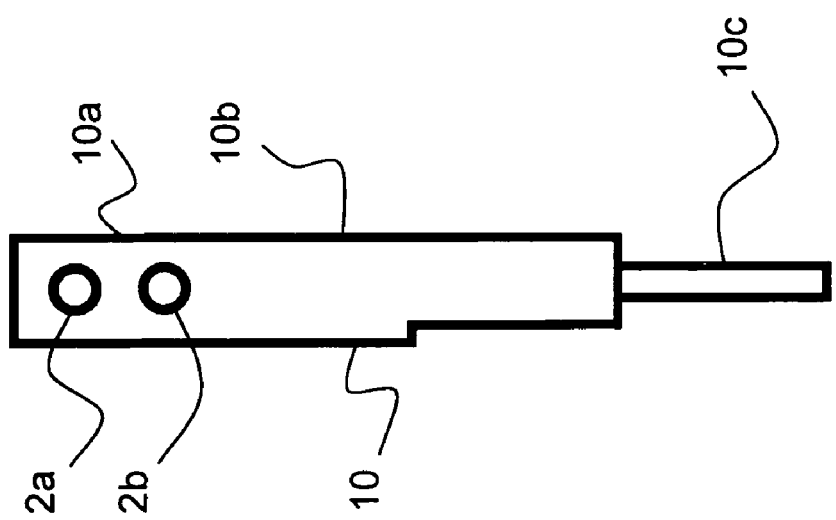
FIG. 2 is a side view of one arm of the lens holder of FIG. 1, showing the reduced thickness of the second end portion of the arm.

As shown on FIG. 2, the second end portion 10c of lateral arm 10 is thinner than the intermediate and first end portion 10b, 10a. Typically, the thickness of second end portion 10c in the direction perpendicular to the general plane of the holder is about 4 mm. Similarly, the second end portions 20c, 30c of central arm 20 and lateral arm 30 are thinner than their intermediate and first end portions, being typically of a thickness of 4 mm.

According to the invention, at least the second end portions 10c, 20c, 30c and preferably the entire arms 10, 20, 30 are made of a material having a dielectric constant at 1 MHz of at least 3.0 and preferably also a specific heat higher than 1.2 kJ kg$^{-1}$K$^{-1}$.

A preferred material is a polyoxymethylene commercialized under tradename DELRIN®.

The second end portions of the arms can also be made of a metal or coated with a metal such as aluminum. In that case, preferably, the other portions of the arms are made of an electrically insulating material, in particular a plastic material.

For placing a lens 3 in the holder 1, the user first moves, for example, lateral arm 30 away from central arm 20 by slidably translating arm 30 on rails 2a, 2b against spring 4. He then places the lens 3 with its optical axis orthogonal to the holder general plane in the created space between the facing recesses 22, 31 of central arm 20 and lateral arm 30. Once the lens 3 in the correct position, he liberates lateral arm 30 which under the action of spring 4 is urged towards central arm 20, into contact with the periphery of lens 3, thereby firmly maintaining lens 3 in position. Depending on the shape of the recesses, the lens 3 is firmly maintained by central arm 20 and lateral arm 30 through 2 or 4 contact points between the lens periphery and the second end portions of the arms.

Lateral arm 10 functions in a similar way as lateral arm 30, thus permitting accomodation of a second lens in the holder.

Of course, the holder 1 may solely comprise two arms. In that case, one of the arm may be fixed and the other is movable or both arms can be movable.

Referring to FIGS. 3 to 5, there is represented another embodiment of an optical lens holder according to the invention.

The lens holder 1 comprises a supporting means such as an elongated plate 2 to be held vertically and two spaced apart arms 10, 20 projecting horizontally from one face of elongated plate 2. As shown in the drawings, the arms are also formed of two elongated plates. The mutually facing surfaces of the arms 10, 20 are each provided with two spaced apart tabs 11, 12; 21, 22, projecting perpendicularly from the surface of the arm.

The tabs on one of the arm surface are in register with the tabs of the facing surface of the other arm.

The free ends of each tab 11, 12; 21, 22 are provided with a notch 13, 14; 23, 24 preferably a notch having an angle of at least 90°.

As indicated earlier, the arms 10, 20 may be mounted on supporting means 2 by one end portion thereof through means (not represented) allowing relative slidable translation of the arms on the supporting means 2.

However, the arms 10, 20, the tabs 11, 12, 21, 23 and the supporting plate 2 may be a single molded piece, with either the arms or the tabs being elastically deformable.

Of course, as previously indicated, the tabs and also preferably the portion of the arms in the vicinity of the tabs shall be made of a material having the required dielectric constant and also preferably the required specific heat.

Figure 6:
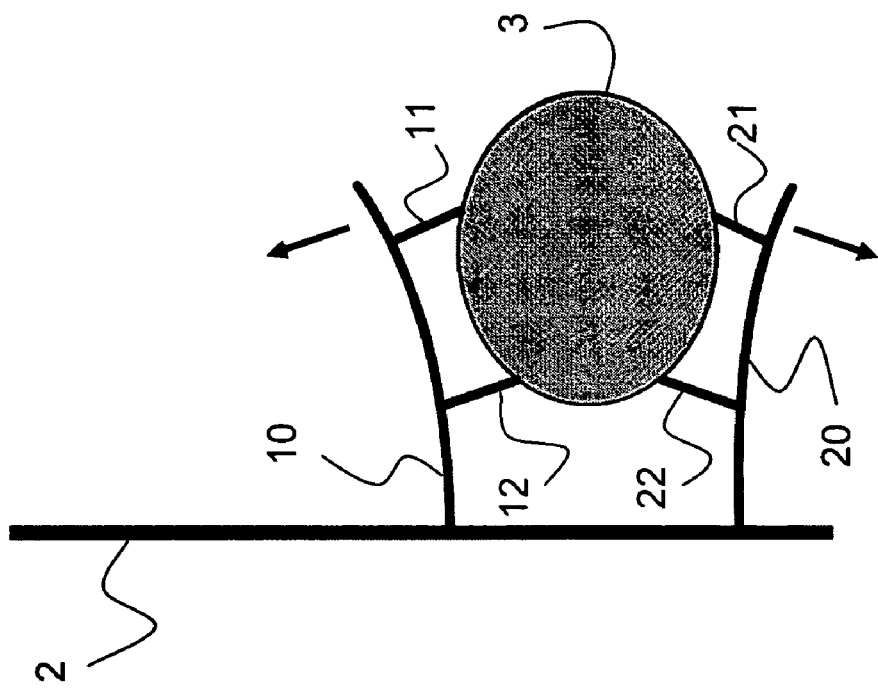
FIG. 6 is a schematic front view of an optical lens holder similar to the lens holder of FIG. 3 but with elastically deformable arms.

When a user wants to place an optical lens in this holder, he first moves away from each other the arms 10, 20 either by slidably translating them away from each other or by elastically deforming them away from each other as shown in FIG. 6. Then the user introduces the lens 3 in the accommodating space thus formed, with the lens optical axis perpendicular to the general plane of the lens holder, i.e. the plan of drawing sheet, and moves the arms towards each other or let them move to their initial relative position due to elastic forces of the arms so that the lens 3 is maintained in the holder through four (4) contact points between the lens periphery and the holder.

When only the tabs are elastically deformable, the user needs only to force lens 3 in position against the tabs which, due to their elasticity will accomodate the lens and maintain it.

EXAMPLE 1

Polycarbonate lenses having circular edge (diameter 65 mm) were submitted to a corona discharge using a lens holder as shown in FIG. 1 having arms made of DELRIN® according to the invention, and for comparison made of TEFLON®.

Properties of the different materials are indicated in Table I below:

TABLE I

| Properties | Teflon ® | Polycarbonate optical grade | Delrin ® |
|---|---|---|---|
| Dielectric constant at 1 MHz | 2.1 | 2.9 | 3.7 |
| Dielectric strength | 24 kV/mm | 30 kV/mm | 19.7 kV/mm |
| Dissipation Factor | 0.0003–0.0007 | 0.01 | 0.005 |
| Specific Heat kJ/kg.K | 1.4 | 1.2 | 1.5 |

In each case, the lenses were passed in front of the corona discharge at a speed of 3 mm/s, and then moved down 26 mm and passed again in front of the corona discharge at the same speed.

The corona apparatus is a Multidyne unit from 3 DT. The corona heads are located at 17 mm from the holder.

The holder used is as described on FIGS. 1 and 2.

The thickness of the parts 10c, 20c and 30c is 4 mm.

Burn marks are observed at the contact points of the lens held by the TEFLON® holder but no defects were observed on the lens held by the DELRIN® holder.

EXAMPLE 2

Polycarbonate lens whose edge has a rectangular shape (after being edged by an edging machine) is placed in a lens holder according to the invention as shown in FIGS. 1 and 2 and is submitted to a corona discharge treatment.

The lens holder has arms made of DELRIN® with a 4 mm thickness of the lens accommodating portion, and an aluminum foil covering the lens accommodating portion of each arm.

The lens is passed in front of the corona heads at a speed of 17 mm/s, then is lowered down to 26 mm. This treatment is repeated 4 times. A delay of 5 s is observed between each passages (except when the lens is lowered down).

No defects are observed.

What is claimed is:

1. An optical lens holder comprising a support and a first and a second arm defining a lens holder general plane, first and second arms being relatively movable with regard to each other and each arm having spaced apart first and second end portions and an intermediate portion, the arms being mounted on the support through their first end portions and the second end portions of each arm adapted to accommodate an optical lens during use, whereby an optical lens can be maintained within the first and second arms with its optical axis orthogonal to the general plane of the lens holder through at least one contact point between the lens periphery and each of the first and second arms, wherein at least the second end portion of each arm comprises a material having a dielectric constant at 1 MHz equal to or higher than the dielectric constant of the optical lens material.

2. The optical lens holder of claim 1, further defined as comprising one or two contact points between the lens periphery and each of the first and second lens arms.

3. The optical lens holder of claim 1, wherein the support is not electrically conductive.

4. The optical lens holder of claim 1, wherein the material of the second end portion of each arm has a dielectric constant at 1 MHz of 3.0 or more.

5. The optical lens holder of claim 1, wherein the material of the second end portion of each arm has a specific heat (kJ kg$^{-1}$ K$^{-1}$) higher than the specific heat of the optical lens material.

6. The optical lens holder of claim 5, wherein the material of the second end portion of each arm has a specific heat higher than 1.2 kJ kg$^{-1}$ K$^{-1}$.

7. The optical lens holder of claim 1, wherein the material of the second end portion of each arm is polyacrylonitrile-butadiene-styrene (ABS), polyoxymethylene homo and copolymers (POMH and POMC) cellulose acetate (CA), cellulose acetate butyrate (CAB), polyamides, polyetherimides (PEI), polymethylmethacrylates (PMMA) or polyaramides.

8. The optical lens holder of claim 1, wherein the second end portion of each arm is either made of or covered with an electroconductive material.

9. The optical lens holder of claim 8, wherein the electroconductive material is a metal.

10. The optical lens holder of claim 9, wherein the metal is aluminum, stainless steel, copper, brass, or gold.

11. The optical lens holder of claim 8, wherein the intermediate portion and first end portion of the arms are made of an electrically insulating material.

12. The optical lens holder of claim 1, wherein the second end portion of each arm is thinner than the intermediate and first end portions in a direction orthogonal to the general plane of the lens holder.

13. The optical lens holder of claim 12, wherein the thickness of the second end portion of each arm ranges from 2 mm to less than 13 mm.

14. The optical lens holder of claim 13, wherein the thickness of the second end portion of each arm ranges from 2 mm to 10 mm.

15. The optical lens holder of claim 1, wherein each of the second end portion of each arm adapted to accommodate an optical lens during use lens comprises a recess having a bottom wall and two inclined sidewalls.

16. The optical lens holder of claim 15, wherein the inclined sidewalls form an angle of at least 120° with the bottom wall.

17. The optical lens holder of claim 1, wherein the support comprises a pair of parallel rails, first and second arms being movable by translation on said pair of rails, relatively to each other.

18. The optical lens holder of claim 1, wherein the second end portion of the second arm is provided with an additional portion adapted to accommodate an optical lens during use, and further comprising a third arm opposite to the first arm and lying in the lens holder general plane, relatively movable with regard to the second arm and having spaced apart first and second end portions and an intermediate portion, the third arm being mounted on the support through its first end portion and the second end portion of the third arm being provided with a portion adapted to accommodate an optical lens during use, whereby an additional lens can be maintained between the third arm and the second arm with its optical axis orthogonal to the general plane of the lens holder through at least one contact point between its periphery and each of the second arm and the third arm, wherein at least the second end portion of the third arm comprises a material having a dielectric strength of 1 MHz equal to or higher than the dielectric constant of the optical lens material.

19. The optical lens holder of claim 18, wherein the support is not electrically conductive.

20. The optical lens holder of claim 18, wherein the material of the second end portion of each arm has a dielectric constant at 1 MHz of 3.0 or more.

21. The optical lens holder of claim 18, wherein the material of the second end portion of each arm has a specific heat (kJ kg$^{-1}$ K$^{-1}$) higher than the specific heat of the optical lens material.

22. The optical lens holder of claim 18, wherein the material of the second end portion of each arm has a specific heat higher than 1.2 kJ kg$^{-1}$ K$^{-1}$.

23. The optical lens holder of claim 18, wherein the material of the second end portion of each arm is polyacrylonitrile-butadiene-styrene (ABS), polyoxymethylene homo and copolymers (POMH and POMC) cellulose acetate (CA), cellulose acetate butyrate (CAB), polyamides, polyetherimides (PEI), polymethylmethacrylates (PMMA) or polyaramides.

24. The optical lens holder of claim 18, wherein the second end portion of each arm is either made of or covered with an electrically conductive material.

25. The optical lens holder of claim 24, wherein the electroconductive material is a metal.

26. The optical lens holder of claim 25, wherein the metal is aluminum, stainless steel, copper, brass, or gold.

27. The optical lens holder of claim 24, wherein the intermediate portion and first end portion of the arms are made of an electrically insulating material.

28. The optical lens holder of claim 18, wherein the second end portion of each arm is thinner than the intermediate and first end portions in a direction orthogonal to the general plane of the lens holder.

29. The optical lens holder of claim 28, wherein the thickness of the second end portion of each arm ranges from 2 mm to less than 13 mm.

30. The optical lens holder of claim 29, wherein the thickness of the second end portion of each arm ranges from 2 mm to 10 mm.

31. The optical lens holder of claim 18, wherein each of the second end portions of each arm adapted to accommodate an optical lens during use comprises a recess having a bottom wall and two inclined sidewalls.

32. The optical lens holder of claim 31, wherein the inclined sidewalls form an angle of at least 120° with the bottom wall.

33. The optical lens holder of claim 18, wherein the second end portion of each arm adapted to accommodate an optical lens during use comprises a pair of parallel rails, the first and third arms being movable by translation on said pair of rails.

34. The optical lens holder of claim 1, wherein the second end portion of each arm adapted to accommodate an optical lens during use comprises two identical spaced apart tabs projecting perpendicularly from the first and second arms.

35. The optical lens holder of claim 34, wherein each tab comprises a lens receiving notch at its free end.

36. The optical lens holder of claim 34, wherein first and second arms are movable by translation on the support.

37. The optical lens holder of claim 34, wherein first and second arms are elastically deformable.

38. The optical lens holder of claim 34, wherein only the tabs are elastically deformable.

39. The optical lens holder of claim 34, wherein the material of the second end portion of each arm has a dielectric constant at 1 MHz of 3.0 or more.

40. The optical lens holder of claim 34, wherein the material of the second end portion of each arm has a specific heat (kJ kg$^{-1}$ K$^{-1}$) higher than the specific heat of the optical lens material.

41. The optical lens holder of claim 34, wherein the material of the second end portion of each arm has a specific heat higher than 1.2 kJ kg$^{-1}$ K$^-$.

42. The optical lens holder of claim 34, wherein the material of the second end portion of each arm is polyacrylonitrile-butadiene-styrene (ABS), polyoxymethylene homo and copolymers (POMH and POMC) cellulose acetate (CA), cellulose acetate butyrate (CAB), polyamides, polyetherimides (PEI), polymethylmethacrylates (PMMA) or polyaramides.

43. The optical lens holder of claim 34, wherein the second end portion of each arm is either made of or covered with an electrically conductive material.

44. The optical lens holder of claim 43, wherein the electroconductive material is a metal.

45. The optical lens holder of claim 44, wherein the metal is aluminum, stainless steel, copper, brass or gold.

46. The optical lens holder of claim 43, wherein the intermediate portion and first end portion of the arms are made of an electrically insulating material.

47. The optical lens holder of claim 34, wherein the second end portion of each arm is thinner than the intermediate and first end portions in a direction orthogonal to the general plane of the lens holder.

48. The optical lens holder of claim 47, wherein the thickness of the second end portion of each arm ranges from 2 mm to less than 13 mm.

49. The optical lens holder of claim 48, wherein the thickness of the second end portion of each arm ranges from 2 mm to 10 mm.

50. The optical lens holder of claim 35, wherein the notch has the shape of a V.

51. The optical lens holder of claim 50, wherein the angle of the V notch is 90° or more.

* * * * *

UNITED STATES PATENT AND TRADEMARK OFFICE
CERTIFICATE OF CORRECTION

PATENT NO. : 6,972,914 B2 Page 1 of 1
DATED : December 6, 2005
INVENTOR(S) : Gerald Foumand et al.

It is certified that error appears in the above-identified patent and that said Letters Patent is hereby corrected as shown below:

<u>Column 6,</u>
Line 66, delete second occurrence of "lens".

Signed and Sealed this

Twenty-eighth Day of March, 2006

JON W. DUDAS
*Director of the United States Patent and Trademark Office*